May 22, 1945.   R. R. STREBINGER   2,376,732
CARBURETOR
Filed July 5, 1941
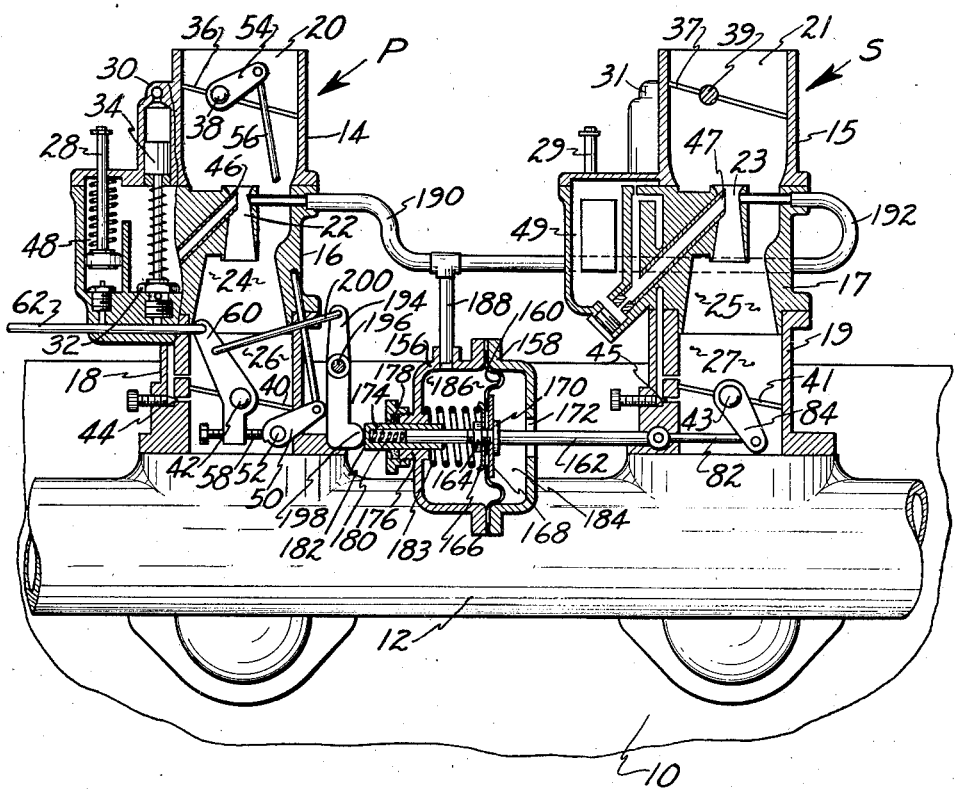
INVENTOR
RICHARD R. STREBINGER
BY
ATTORNEY Patented May 22, 1945

2,376,732

UNITED STATES PATENT OFFICE 2,376,732

CARBURETOR

Richard R. Strebinger, South Bend, Ind., assignor to Bendix Aviation Corporation, South Bend, Ind., a corporation of Delaware Application July 5, 1941, Serial No. 401,170

1 Claim. (Cl. 261—23)

This invention relates to carburetors and more particularly to means for controlling the throttle valves in multiple stage carburetor systems for internal combustion engines. Certain subject matter of this application has been divided herefrom and is now being claimed in applicant's copending application Serial No. 542,978 filed June 30, 1934.

Multiple stage carburetor systems for widely variable speed internal combustion engines such as are commonly used in automotive vehicles and the like may comprise either a plurality of separate carburetors or a single carburetor having a plurality of induction passages. In either arrangement there are a plurality of induction passages connected to a common intake manifold or to complementary manifolds, throttle valves for the respective induction passages, and means for controlling the throttle valves whereby they are opened progressively.

The general purpose of this type of carburetor system is to supply the engine with an economical fuel mixture from a primary source, which may comprise one primary induction passage or a plurality of said passages, throughout the lower speed range which in an automobile engine is used to the greatest extent, and to supply the engine with a supplementary mixture from one or more supplementary or auxiliary induction passages at speeds above said lower speed range, thereby increasing the volume of the mixture delivered to the engine to permit said engine to develop its maximum speed and power. This involves closing off the supplemental passage or passages when the engine is operating under low speed wide open throttle conditions, in order to furnish the engine with a mixture of combustible proportions under such conditions and permit very low speed operation without misfiring or stalling. The reason the engine will operate at lower speeds without missing when supplied with fuel mixture by one induction passage than when thus supplied by a plurality of passages is that the velocity of the air flowing to the engine through one passage is greater than if the same volume of air were flowing to the engine through a greater number of passages, and with greater velocity the air picks up more fuel and sustains said fuel until it reaches the engine cylinders.

The throttle valve for the primary induction passage or first stage is manually controlled, being customarily connected with the accelerator pedal of the automobile. Various means have been employed to automatically control the remaining throttle valve or valves but such means have not proved entirely satisfactory in controlling a carburetor system of the multiple stage type so as to accurately meet the fuel mixture requirements of the engine under all operating conditions.

Among the automatic controls for the throttle valves of stages subsequent to the primary stage are various types of suction responsive means which may be connected to one or more of the induction passages. In carburetor systems using such vacuum responsive means for opening the throttle valves of supplemental induction passages, difficulty is sometimes encountered in effecting the closing of said valves particularly after said valves have been opened to a substantial degree.

It is therefore an important object of the invention to provide in a multiple stage carburetor system means for controlling the volume and fuel-to-air ratio of the fuel mixture according to the requirements of the engine throughout its operating range.

It is a further object of the present invention to provide means for effecting proper closing movement of the supplemental throttle valves of a multiple stage carburetor system employing automatic means for opening said valves, upon decelerating movement of the accelerator mechanism.

Still another object of the invention is to provide a device of this character wherein the throttle valves of supplementary stages are controlled by the position of the throttle valve of a preceding stage.

A further object of the invention is to provide a device of this character wherein the supplementary throttle valve or valves will normally be closed during the starting operation of the engine.

A still further object of the invention is to provide a device of this character wherein the supplementary throttle valve or valves will be positively closed upon closing of the primary throttle valve.

The characteristics and advantages of the invention are further sufficiently referred to in connection with the following detailed description of the accompanying drawing which represents certain preferred embodiments. After considering these examples, skilled persons will understand that many variations may be made without departing from the principles disclosed, and I contemplate the employment of any structures, arrangements or modes of operation that are properly within the scope of the appended claim.

The drawing diagrammatically illustrates an internal combustion engine provided with a multiple stage fuel induction system embodying the present invention, said system comprising a plurality of independent carburetors shown in vertical section.

While the invention is shown and described embodied in a multiple stage carburetor system having one primary and one supplemental or secondary induction passage it may also be embodied in such a system having a plurality of both primary and supplemental induction passages or a single passage for one stage and a plurality of passages for another stage or stages. It may also be embodied in a system of this character wherein the engine has a dual or multiple type of intake manifold, each part of which has connected therewith corresponding primary and supplemental induction passages.

Referring to the drawing reference numeral 10 indicates the engine and 12 the intake manifold thereof having a primary carburetor P and a secondary carburetor S attached thereto. The respective carburetors P and S comprise air horn sections 14 and 15, body sections 16 and 17, and throttle body sections 18 and 19. The induction passages of said carburetors include air entrances 20 and 21, small venturis 22 and 23, large venturis 24 and 25, and mixture passages 26 and 27 respectively. Acceleration pumps 28 and 29 and economizer systems 30 and 31 are provided in the respective primary and secondary carburetors, said economizer systems including a valve 32 and vacuum responsive means 34 controlling said valve.

The respective air entrances 20 and 21 are controlled by the usual unbalanced choke valves 36 and 37 on shafts 38 and 39, said valves being controlled by manual or automatic means, not shown, and the mixture passages 26 and 27 are controlled by respective throttle valves 40 and 41 on shafts 42 and 43. The choke valve 37 may be omitted if desired. The primary and secondary carburetors have idling systems 44 and 45 respectively and main fuel nozzles 46 and 47 supplied with fuel from fuel chambers 48 and 49 and discharging in the respective small venturis 22 and 23, in the known manner.

The primary carburetor is provided with a fast idle mechanism one type of which is illustrated in the drawing and which includes a fast idle cam 50 pivoted at 52 and connected with a choke valve lever 54 on shaft 38 by a rod 56. The cam 50 is engageable with a screw 58 in an extension of primary throttle lever 60 secured to one end of the shaft 42, said lever 60 being connected with the usual accelerator pedal or other operating member, not shown, by rod 62.

Automatic suction responsive means for actuating the secondary throttle valve 41 is provided and, as shown, comprises shell or casing members 156 and 158 having a flexible diaphragm 160 clamped therebetween with rod 162 extending therethrough and fixed thereto in sealed relation by any suitable means which in the present disclosure comprises a nut 164 which clamps the diaphragm between a washer 166 on one side thereof and a plate 168 on the other side, said plate being interposed between a flange 170 on rod 162 and said diaphragm. One end of rod 162 extends through an enlarged opening 172 in casing member 158 and is connected with the rod 82. The other end of the rod 162 is slidably received in a sleeve 174 which in turn is longitudinally slidable in boss 176 provided with a packing gland 178 to prevent leakage of air past the plunger. Within the sleeve 174 is a dampener spring 180 which reacts between the closed outer end 182 of said sleeve and the adjacent end of rod 162 and has a cushioning effect therebetween. Another spring, 183, is provided to react between the casing member 156 and washer 166 urging the diaphragm to the right, as viewed in the drawing, and is adapted to yieldingly effect closing of the throttle valve 4'.

The control unit for the secondary throttle valve is divided by the diaphragm into two parts, a chamber 184 which is exposed to atmospheric pressure by means of opening 172 and a closed chamber 186 which is connected to the small venturis 22 and 23 of the primary and secondary induction passages respectively by conduits 188, 190 and 192 so that the pressure in chamber 186 is the resultant of the pressures in the small venturis of the primary and secondary induction passages.

Means for effecting closing of the secondary throttle valve 41 includes a lever 194 pivoted at 196 and having a rounded projection 198 adjacent one end thereof which is engageable with the free end 182 of plunger 174 and which provides a one way connection limiting outward movement of the plunger relative to the chamber 186, the lever 194 being connected to the primary throttle lever 60 by a link 200.

Operation of the embodiment of the invention shown in the drawing is as follows:

When the primary throttle valve 40 is in the closed position plunger 174 is urged inwardly of the chamber 186 by lever 194 thereby compressing spring 180 which aids spring 183 in urging the secondary throttle valve to the closed position and said springs normally retain the secondary throttle valve in said position during the starting period of engine operation and at other times as hereinafter described.

Throughout the lower speed range of the engine it is normally supplied with fuel mixture only by the primary induction passage. As the primary throttle valve 40 is opened, the end of lever 194 having the projection 198 is moved toward the left as viewed in the drawing, whereupon spring 180 expands and causes the plunger 174 to move outwardly relative to chamber 186. However, the outward movement of said plunger is limited by the projection 198, and the force of the spring 180 on the end of rod 162 combined with that of spring 183 is sufficient to retain the secondary throttle valve in the closed position until the primary throttle valve is opened sufficiently under normal operating conditions to supply the engine with the volume of fuel mixture to operate said engine at a speed above the lower predetermined range referred to in connection with the other embodiments of the invention, at which speed the vacuum in chamber 186 is of such value that atmospheric pressure in chamber 184 effects initial opening of the secondary throttle valve, said atmospheric pressure being sufficient to overcome the valve closing force to springs 180 and 183.

The reduction of pressure in chamber 186, referred to in the next preceding paragraph, is effected by means of the conduits 188, 190 and 192 connecting said chamber with the small venturis of the primary and secondary induction passages respectively.

When the primary throttle valve 40 is in the idling position there is but slight reduction of pressure in the small venturi 22 of the primary induction passage which is diminished by air bled through conduit 192. Upon opening movement of the valve 40 the engine speed increases thereby permitting increased air flow through the primary induction passage which results in increased suction in conduit 190, however the air bled through conduit 192 prevents sufficient reduction of pressure in chamber 186 to permit atmospheric pressure in chamber 184 to effect opening of the secondary throttle valve against the force of springs 180 and 183 until the primary throttle valve has been opened the predetermined amount whereat the engine speed will be above said lower speed range. When the throttle valve 40 has been opened said predetermined amount the reduction of pressure in chamber 186 is such that the secondary throttle valve 41 is initially opened by atmospheric pressure on the diaphragm 160 and further opening of the primary throttle valve 40 will effect further opening of the secondary throttle valve 41, due to the increased velocity of air in the primary induction passage and to the suction which occurs in the secondary induction passage after the secondary throttle valve is opened. As the secondary throttle valve opens, bleeding of air through conduit 192 diminishes as the suction in the secondary induction passage increases, thereby increasing the suction transmitted to chamber 186 to aid in further opening of the secondary throttle valve. Should the engine now be placed under sufficient load to greatly reduce its speed the velocity of air in the primary and secondary induction passages will decrease accordingly and upon sufficient reduction of speed the suction or vacuum in said passages will decrease to a value whereat the pressure in chamber 186 will rise and approach atmospheric pressure whereupon springs 180 and 183 will have sufficient force to close the secondary throttle valve 41 and the engine will then be supplied with fuel mixture only by the primary induction passage.

However, when the engine is operating at high speed with both throttle valves open and it is desired to decelerate, closing movement of the manually operable valve control mechanism will effect closing movement of both primary and secondary throttle valves. As the primary throttle valve is closed the flow of air through the primary induction passage is reduced resulting in a corresponding reduction of suction in chamber 186. Simultaneously with the closing of the primary throttle valve lever 194 urges plunger 174 inwardly of the chamber 186 and compresses spring 180 and increases the closing force thereof on the rod 162 and the linkage connecting said rod with the secondary throttle valve. The combined effect of the reduction in suction in chamber 186, the increased closing pressure of spring 180 and the force of spring 183 results in closing of the secondary throttle valve which is fully closed thereby before the primary throttle valve is fully closed. It is to be noted that in the absence of the mechanism for closing the secondary throttle valve closing of the primary throttle valve might not effect closing of the secondary valve due to the suction in the secondary induction passage which may remain sufficiently high to overcome the closing force of spring 183 even though air is bled to the control device through conduit 190. Further it should be noted that the closing movement of lever 194 is such that substantially full compression of spring 180 will be effected when the secondary throttle valve is in an open position and as a result said lever will positively effect closing of the secondary throttle valve when the primary throttle valve is closed.

It is thought that the invention and many of its attendant advantages will be understood from the foregoing description and though said invention has been illustrated and described herein in connection with but a single embodiment it will be apparent that various changes may be made in the form, construction and arrangement of the parts without departing from the spirit and scope of the invention or sacrificing all of its material advantages.

I claim:

In a multiple stage charge forming device having a primary induction passage, secondary induction passage, and a throttle valve in each passage: means for controlling the primary throttle valve; suction responsive means for controlling the opening of the secondary throttle valve; said suction responsive means being connected to both induction passages; and yielding means connected with the means for controlling the primary valve for closing the secondary valve.

RICHARD R. STREBINGER.